(12) United States Patent
Unru et al.

(10) Patent No.: US 12,500,512 B2
(45) Date of Patent: Dec. 16, 2025

(54) POWER CONVERTER FOR TRANSFERRING POWER BETWEEN AN AC SIDE AND A DC SIDE, AND POWER SUPPLY METHOD

(71) Applicant: SMA Solar Technology AG, Niestetal (DE)

(72) Inventors: Alexander Unru, Baunatal (DE); Marcel Kratochvil, Kassel (DE); Burkard Müller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 235 days.

(21) Appl. No.: 18/316,286

(22) Filed: May 12, 2023

(65) Prior Publication Data

US 2023/0291303 A1    Sep. 14, 2023

Related U.S. Application Data

(63) Continuation of application No. PCT/EP2021/081549, filed on Nov. 12, 2021.

(30) Foreign Application Priority Data

Nov. 12, 2020   (DE) ..................... 10 2020 129 919.2

(51) Int. Cl.
*H02M 1/32*      (2007.01)
*H02J 1/00*      (2006.01)
(Continued)

(52) U.S. Cl.
CPC ................. *H02M 1/32* (2013.01); *H02J 1/00* (2013.01); *H02M 1/0009* (2021.05); *H02M 7/04* (2013.01)

(58) Field of Classification Search
CPC ........ H02M 1/0009; H02M 1/09; H02M 1/32; H02M 7/04; H02J 1/00
(Continued)

(56) References Cited

U.S. PATENT DOCUMENTS 10,256,713 B2    4/2019  Fukuda et al.
10,516,365 B1 *  12/2019 Serban ................. H02M 7/487
(Continued)

FOREIGN PATENT DOCUMENTS

CN    204578093 U    8/2015
CN    110544934 A    12/2019
(Continued)

OTHER PUBLICATIONS

International Search Report dated Feb. 17, 2022 for International Application No. PCT/EP2021/081549.
(Continued)

*Primary Examiner* — Yemane Mehari
(74) *Attorney, Agent, or Firm* — Eschweiler & Potashnik, LLC

(57) ABSTRACT

A power converter between an AC side and DC of the power converter is disclosed. The AC side is connected to an AC supply grid and the DC side is connected to a DC grid. The power converter includes a bridge circuit connected to the AC side of the power converter via AC switches and connected to the DC side of the power converter via circuit breakers, wherein a DC link circuit of the power converter is chargeable from the AC supply grid via an AC precharging circuit. The power converter has an insulation monitor to measure the insulation resistance of the DC side when the AC precharging circuit is connected to the DC link circuit. The disclosure also includes a related method.

18 Claims, 3 Drawing Sheets

(51) Int. Cl.
*H02M 1/00* (2006.01)
*H02M 7/04* (2006.01)

(58) Field of Classification Search
USPC .......................................................... 323/282
See application file for complete search history.

(56) References Cited

U.S. PATENT DOCUMENTS

| | | | |
|---|---|---|---|
| 10,554,148 B2 | 2/2020 | Brueckner et al. | |
| 11,159,011 B2 | 10/2021 | Schelenz et al. | |
| 2012/0126839 A1 | 5/2012 | Schaefer et al. | |
| 2013/0193766 A1* | 8/2013 | Irwin | H02J 3/381 363/51 |
| 2016/0126858 A1 | 5/2016 | Wu et al. | |
| 2019/0157982 A1 | 5/2019 | Brueckner et al. | |
| 2019/0237994 A1* | 8/2019 | Takeuchi | H02M 1/36 |
| 2022/0285973 A1 | 9/2022 | Zhang et al. | |
| 2023/0283069 A1* | 9/2023 | Unru | H02M 1/32 307/31 |

FOREIGN PATENT DOCUMENTS

| | | | | |
|---|---|---|---|---|
| CN | 110994968 A | 4/2020 | | |
| CN | 111884200 A1 | 11/2020 | | |
| DE | 112016002475 T5 | 2/2018 | | |
| DE | 102017127311 A1 | 5/2019 | | |
| DE | 102018116013 A1 | 1/2020 | | |
| EP | 2256506 A1 | 12/2010 | | |
| EP | 3370321 A1 * | 6/2018 | ............ | H02H 9/001 |
| EP | 3584903 A1 | 12/2019 | | |
| WO | 2019237785 A1 | 12/2019 | | |

OTHER PUBLICATIONS

"IEC 63112 ED1: Safety, funtionality and classifiation of Photovoltaic Earth Fault Protection (PV EFP) equipment", Published Jun. 5, 2020.

"Sicherheit von Leistungsumrichtern zur Anwendung in photovoltaischen Energiesystemen-Teil 2: Besondere Anforderungen an Wechselrichter (IEC 62109-2:2011): Deutsche Fassung EN 62109-2:201 = Safety of power converters for use in photovoltaic power systems—Part 2: Particular requirements for invert" Published Apr. 1, 2012.

* cited by examiner

POWER CONVERTER FOR TRANSFERRING POWER BETWEEN AN AC SIDE AND A DC SIDE, AND POWER SUPPLY METHOD

CROSS REFERENCE TO RELATED APPLICATIONS

This application is a continuation of International Patent Application Number PCT/EP2021/081549, filed on Nov. 12, 2021, which claims priority to German Patent Application number 10 2020 129 919.2, filed on Nov. 12, 2020, and is hereby incorporated by reference in its entirety.

FIELD

The disclosure is directed to a power converter and a method with easier-to-handle or improved protection against ground currents that may flow when a DC grid is connected to a grounded AC supply grid.

BACKGROUND

A DC energy system comprises at least one energy source that makes available electric power, for example, in the form of DC current, that is to say a DC source, for example, a battery, a PV generator or a fuel cell, and at least one load that consumes electric power, for example, in the form of DC current, that is to say a DC sink, for example, a consumer, and connections between these electrical components. The DC energy system may comprise a DC grid or a DC bus where the electrical components are connected, and comprise further sources, stores and/or consumers. The transition between a DC bus with a few connected components, for example, just one source and one sink, and a DC grid with a large number of such components is fluid. In this application, the term DC grid is also understood to mean a DC bus.

Such a DC grid may be operated with or without grounding. Depending on the specific operating mode, different monitoring and protection mechanisms may be required by standards in the event of a ground fault.

An ungrounded DC grid, in which the potentials DC+ and DC− of the respective DC lines DCL+ and DCL− have no fixed reference to ground potential, has the advantage that any first ground fault in the DC grid, for example, an insulation fault along one of the DC lines, still does not lead to any harm. However, insulation monitoring is required in order to detect the occurrence of any fault and, if necessary, to be able to initiate countermeasures when a first ground fault occurs, for example, to switch off the energy source or to disconnect the energy source and/or the fault location from the DC grid.

In a grounded DC grid, the potentials DC+ and DC− have a defined reference to ground potential. Such a ground reference may easily be implemented, for example, by way of a resistive connection between the ground potential and one of the DC potentials DC+ or DC−.

A DC grid may be connected, via a power converter, to a further energy grid, for example, a further DC grid or an AC grid, for example, an AC supply grid, and exchange electric power with the further energy grid, for example, in order to support or recharge the DC source in the DC grid. The DC grid may in principle also be supplied permanently or at times completely with energy from the further energy grid via the power converter, wherein the energy source of the DC grid may be used to buffer power fluctuations if necessary.

If the further energy grid has grounding, for example, in the form of a grounded neutral conductor, and the power converter is designed to be transformerless, that is to say has no galvanic isolation between the AC and DC side, the DC grid is automatically provided with a fixed ground reference, that is to say grounded, via the power converter. The specific position of the potentials of the DC grid relative to the ground reference is predefined in this case by the specifically used topology of the power converter. By way of example, on the DC side, the power converter may have a divided link circuit the center tap, that is to say mid-potential, of which is connected to a neutral conductor with a fixed ground reference, such that the DC potentials in the link circuit are largely symmetrical about the ground potential.

In this respect, a DC grid that is not grounded per se likewise becomes a grounded grid through a connection to a grounded energy grid via a transformerless power converter. This may thus result in two operating states for such a DC grid: an ungrounded "stand-alone" mode and a grounded mode when connected to the grounded energy grid. This should be taken into account when designing the system.

However, if a grounded DC grid is connected to a grounded AC grid, for example via a power converter, this may result in such high, uncontrolled current flows between the grids that components of the power converter or components of the grids are damaged. This also applies if an insulation fault is present in a supposedly ungrounded DC grid.

WO2013/178654 A1 describes insulation monitoring for a DC grid that makes it possible to measure an insulation resistance of a DC grid using a grounding resistor that connects a mid-potential, that is present between switching elements of a half-bridge, of a bridge circuit of a power converter connected to the DC grid to ground potential via a grounding switch.

In this application, the abbreviation DC stands for direct current or direct voltage and AC stands for alternating current or alternating voltage.

SUMMARY

The disclosure is directed to a power converter and a method with easier-to-handle or improved protection against ground currents that may flow when a DC grid is connected to a grounded AC supply grid.

In a power converter for transferring power between an AC side of the power converter and a DC side of the power converter, the AC side of the power converter is connectable to a grounded three-phase AC supply grid and the DC side of the power converter is connectable to an ungrounded DC grid. The power converter has a bridge circuit the AC terminals of which are connectable to the AC side of the power converter via AC switches and the DC terminals of which are connectable to the DC side of the power converter via circuit breakers. A DC link circuit of the power converter is used to buffer-store energy during operation of the power converter and may be part of the bridge circuit. The DC link circuit is chargeable from the AC supply grid via a galvanically isolating AC precharging circuit. The power converter has an insulation monitor that is configured to measure the insulation resistance of the DC side of the power converter when the AC precharging circuit is connected to the DC link circuit.

In the bridge circuit, the AC current provided at the terminals is converted into DC current provided at the DC terminals, for example, through clocked driving of semiconductor switches.

The AC precharging circuit allows the capacitors of the DC link circuit to be charged from the AC supply grid in a state in which the AC side of the power converter may be disconnected from the AC supply grid. The AC precharging circuit has galvanic isolation, for example, by virtue of providing a transformer in the AC precharging circuit, for example in the form of a flyback converter. Another advantage is that the AC precharging circuit may thereby be designed as an inherently short-circuit-proof circuit, thereby reducing the risk of fire, for example, in the event of any short circuit in the DC link circuit.

The charging of the capacitors of the DC link circuit from the AC supply grid may be part of a protection concept in which the capacitors of the DC link circuit are charged from the AC supply grid before the AC side of the power converter is connected to the AC supply grid. By providing the galvanic isolation in the AC precharging circuit, a DC grid connected on the DC side of the power converter can remain galvanically isolated from the AC supply grid in such a situation and thus remain without a ground reference, even though capacitors of the DC link circuit are charged from the AC supply grid.

The insulation monitor comprises, for example, measurement of the insulation resistance of the DC link circuit, as described in WO2013/178654 A1. The AC precharging circuit additionally makes it possible to monitor the insulation resistance while the DC link circuit is being precharged from the AC supply grid, and, for example, before the AC side of the power converter is connected to the AC supply grid. The insulation resistance may also be monitored by the insulation monitor that is provided if the AC side of the power converter is disconnected from the AC supply grid, the AC precharging circuit is inactive and the DC grid is connected to the DC side of the power converter.

This enables compliance with standards that may require permanent insulation monitoring, for example, in IT systems. For example, before the AC supply grid is connected to the DC grid for the first time, the insulation resistance of the DC grid may be checked.

In one embodiment, the AC terminals and the DC terminals of the bridge circuit are galvanically coupled and the power transfer path between the AC side and the DC side of the power converter is, for example, designed to be transformerless. This may yield cost advantages compared to a bridge circuit designed with galvanic isolation.

One advantage of such a power converter with an AC precharging circuit, in particular even if it is designed to be transformerless and is, for example, actively driven, is that it is able to be started from the AC side by a precharging process. This is advantageous when starting from the DC side is unfavorable or impossible, for example, because an energy source such as a photovoltaic system or battery is missing on the DC side. In a second act of starting, a check may then be performed for ground faults on the DC side, for example, by measuring the insulation resistance of the DC side. It is often required that the AC side be connected only once sufficient DC-side insulation has been established. The disclosure thus enables starting from the AC side, for example, in the absence of a DC source.

In addition, the measurement of the insulation resistance is not distorted by the precharging circuit, since it is designed to be galvanically isolating.

In one embodiment, the insulation monitor is arranged between the AC side of the power converter and the AC terminals of the bridge circuit. It may comprise a grounding resistor that connects a mid-potential, which lies between switching elements of a half-bridge, of the bridge circuit to ground potential via a grounding switch.

In one embodiment, at least one of the AC switches serves as grounding switch. This makes it possible to reduce costs.

In one embodiment, provision is made for insulation monitoring by way of fault current measurement on the AC terminals, for example, by way of a differential current (DI) sensor.

During operation and when supplying power to DC loads on a DC grid that is fed inter alia, for example, from a power converter, which is a transformerless active rectifier, the ground reference of the DC grid may result from the grounding of the AC supply grid on the AC side of the rectifier. The potentials DC+ and DC− may, for example, be symmetrical and low-resistance with respect to ground via the connection to the AC side. The reference point for the grounding in the DC grid may advantageously be selected such that, for example, a potential close to the mid-potential is connected to the ground potential. The mid-potential may, for example, lie in the middle between DC+ and DC−. A potential close to the mid-potential may, for example, be achieved by symmetrically clocking the semiconductors of a bridge circuit in the middle of this bridge circuit. If the link circuit consists of a series connection of multiple capacitors, such a potential may also be provided at a center tap of this series connection, for example, through connection to the neutral conductor. The voltage of the DC+ and DC− potentials in the DC grid to ground may thereby be limited to around half the total DC voltage, as a result of which, inter alia, requirements for the insulation coordination are accordingly simplified in comparison with grounding to DC+ or DC−. If a DC grid is, for example, grounded at DC−, then the insulation of the lines at DC+ potential has to be designed for the full system voltage to ground and vice versa. This may lead to considerable costs in the case of high system voltages.

If the AC supply grid disconnects from the power converter, then the ground reference is lost. If the DC bus then continues to be operated, for example, by continuing to be supplied with power from a DC source on the DC bus, monitoring for ground faults is then required during operation. This may advantageously be achieved through insulation monitoring by way of the insulation monitor.

The power converter also allows the energy system to be checked regularly, for example, upon each start of the power converter by way of the insulation monitor. In addition, periodic insulation state measurements during operation are possible by way of fault current measurement on the AC terminals, in order to permanently monitor a sufficient insulation state of the energy system.

In one embodiment, at least one circuit breaker with an additionally connectable precharging resistor is present for each DC terminal. In this case, a circuit breaker may be designed with an additionally connectable precharging resistor, for example, connectable by bridging the circuit breaker or as a looped-in parallel connection consisting of a semiconductor switch and a precharging resistor. Providing the precharging resistors makes it possible to monitor the insulation resistance using the insulation monitor when the DC grid is connected to the power converter, wherein the precharging resistor in this case—in the event of a fault— can protect against excessively high currents. The DC terminals may initially be additionally connected individually or together, with or without the provision of the precharging resistor, and then, if the insulation resistance of the DC grid is high enough, together and without the provision of the precharging resistor.

In a further embodiment, only one DC terminal is connected to the DC side of the power converter via a circuit breaker with a precharging resistor connectable in parallel. In this case, the other DC terminal is connected directly to the DC side. This thus saves on a circuit breaker, since only single-pole isolation of the DC terminals with the DC grid connected to the DC side is provided. Here, the insulation resistance may be determined when the circuit breaker is open.

In one embodiment, the power converter has a control circuit or unit that is configured to precharge the DC link circuit through the AC precharging circuit when the AC switches are open, to connect the DC terminals to the DC grid by closing the circuit breakers, then to measure the insulation resistance of the DC grid with an insulation monitor, if the insulation resistance is high enough, to close the AC switches and to set a voltage of the DC grid using the power converter.

In one embodiment, the control circuit or unit is configured to charge the DC link circuit with a power that is significantly lower than the rated power of the power converter.

In one embodiment, the control circuit or unit is configured to additionally connect the precharging resistors selectively for each DC line, in particular when measuring the insulation resistance using the insulation monitor. This serves for example to avoid excessively high currents when connecting the DC link circuit to the DC grid.

In one embodiment, the power converter is configured to set the voltage of the DC side while the DC side is connected to the DC terminals without the interposition of precharging resistors. The power converter is configured, when the DC voltage is set, to supply the DC side with electric power via circuit breakers with bridged charging resistors. This corresponds for example to an operating state "normal mode" of the power converter, in which the DC grid is supplied with electric power from the AC supply grid.

A method for supplying power to an ungrounded DC grid from a grounded three-phase AC supply grid using a transformerless power converter comprising a bridge circuit the DC terminals of which are connectable to the DC grid by way of circuit breakers and the AC terminals of which are connectable to the AC supply grid via AC switches, and comprising a galvanically isolating AC precharging circuit for precharging a DC link circuit of the power converter from the AC supply grid, comprises:
  precharging the DC link circuit through the AC precharging circuit when the AC switches are open,
  connecting the DC terminals to the DC grid by closing the circuit breakers,
  measuring the insulation resistance of the DC grid with an insulation monitor, and
  when the insulation resistance is high enough: closing the AC switches and setting a voltage of the DC grid using the power converter.

If the insulation resistance is too low, the start up of the power converter may be stopped for safety reasons.

The DC link circuit is, in one embodiment, precharged with low power, that is to say with a power that is significantly lower than the rated power of the power converter. No potential reference is created between the DC link circuit and the AC supply grid, since the AC precharging circuit is designed to be galvanically isolating, for example, through the provision of a flyback converter in the AC precharging circuit. The precharging resistors are, in one embodiment, designed with a high ohmic resistance in order to avoid excessively high fault currents in the event of a fault.

In one embodiment, the method further comprises the act whereby at least one DC terminal is connected to the DC grid via a precharging resistor. In this embodiment, the precharging resistors are then taken into account when measuring the insulation resistance using the insulation monitor.

In one embodiment of the method, measuring the insulation resistance comprises a first act in which a first DC terminal is connected to the DC grid via a first precharging resistor, and a second act in which a second DC terminal, different from the first DC terminal, is connected to the DC grid via a second precharging resistor, wherein the insulation resistance is determined from measured values acquired in the first act and in the second act.

In one embodiment of the method, the voltage of the DC grid is set by the power converter while the DC grid is connected to the DC terminals without the interposition of precharging resistors. This corresponds, for example, to an operating state "normal mode" of the power converter, in which the DC grid is supplied with electric power from the AC supply grid.

In one embodiment, at least one DC terminal is connected to the DC grid via a precharging resistor when the AC switches are closed. In this embodiment, the connection to the AC supply grid therefore takes place at least via a precharging resistor of at least one of the DC terminals. This makes it possible to avoid an excessively high current when connecting the DC grid to the DC link circuit.

In one embodiment, the method further comprises:
  in the event of failure of the AC supply grid: opening the AC switches and continuing to operate the DC grid via an energy source connected to the DC grid,
  wherein the insulation resistance of the DC grid is continuously or repeatedly measured using the insulation monitor during continued operation.

It is then possible, as an optional act, upon detection of an insulation fault, that is to say an excessively low insulation resistance of the DC grid to ground potential, to disconnect the DC grid by opening the circuit breakers. If an insulation fault is detected, a fault signal may additionally be generated and transmitted in a suitable manner.

In one embodiment of the method, after the AC switches have been closed, that is to say if the AC supply grid is connected to the DC grid and the DC grid is supplied with electric power from the AC supply grid, insulation monitoring of the DC grid may be carried out by way of a fault current measurement on the AC terminals, for example, by way of a DI converter. This corresponds, for example, to a "normal mode" of the power converter.

In one embodiment of the method, the circuit breakers may be opened before the AC switches are closed. If the AC switches are then closed, the power converter may match the DC voltage on its DC side to a voltage of the DC grid, optionally also balance it about ground potential, and then close the circuit breakers in order to connect the DC grid and supply it with electric power from the AC supply grid via the power converter. This makes it possible to reduce in-rush currents when connecting the DC grid to the AC supply grid.

The power converter and the method allow variable connection of a DC energy system to a grounded AC supply grid, in particular via a transformerless power converter, and at the same time make available a protection concept for such operation.

BRIEF DESCRIPTION OF THE FIGURES

The disclosure is explained in more detail below with the aid of figures.

DETAILED DESCRIPTION

Figure 1:
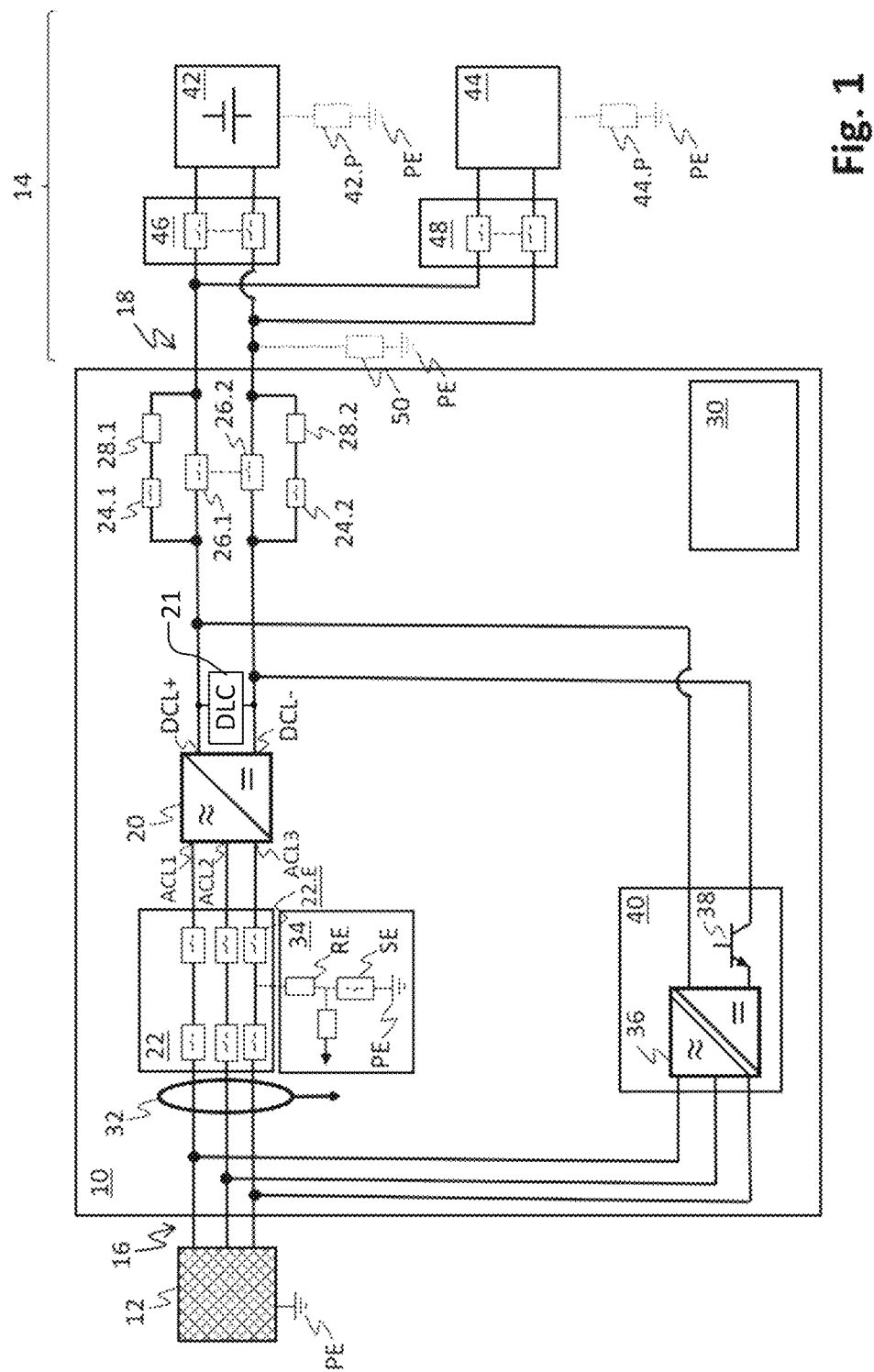
FIG. 1 schematically shows one example embodiment of a power converter.

FIG. 1 schematically illustrates one embodiment of a power converter 10 having an AC side 16 and a DC side 18. A three-phase AC supply grid 12 grounded at the ground potential PE is connected on the AC side 16. A DC grid 14 is connected on the DC side 18. The DC grid 14 has an insulation resistance 50 to ground potential PE. A battery 42 is connectable to the DC grid 14 via DC switches 46. The battery 42 may have an undesirable parasitic resistance 42.P to ground potential PE. A load 44 is connectable to the DC grid via DC switches 48. The load 44 may have an undesirable parasitic resistance 44.P to ground potential PE. A load 44 may, for example, comprise one or more consumers, such as, for example, a machine, an industrial plant, or even an electrolyzer.

The power converter 10 has a bridge circuit 20 that is configured to convert AC current or AC voltage at AC terminals ACL1, ACL2, ACL3 into DC current or DC voltage at DC terminals DCL+, DCL−. The bridge circuit 20 is likewise configured to convert DC current or DC voltage at the DC terminals DCL+, DCL− into AC current or AC voltage at the AC terminals ACL1, ACL2, ACL3. In the illustrated embodiment, the conversion takes place by virtue of a control circuit or unit 30 driving semiconductor switches of the bridge circuit 20 in an appropriate manner. A bridge circuit 20 with semiconductor switches is generally transformerless, that is to say the AC terminals ACL1, ACL2, ACL3 and the DC terminals DCL+, DCL− of such a bridge circuit are galvanically coupled. If the AC supply grid has a ground reference, for example, provided by a grounded neutral conductor, the DC terminals DCL+, DCL− are thus usually also automatically assigned a ground reference via the bridge circuit 20. The specific position of the potentials of the DC terminals relative to the ground reference (DC+/DC− to PE) are predefined in this case by the specifically used topology of the bridge circuit 20. By way of example, the bridge circuit 20 may have, on the DC side, a divided DC link circuit (DLC 21), the center tap of which is connected to the neutral conductor of the AC supply grid 12 with a fixed ground reference PE as mid-potential, such that the DC potentials in the DC link circuit 21 are set largely symmetrically about the ground potential PE. In this respect, a DC grid 14 that is not grounded per se likewise becomes a grounded DC grid 14 through a connection to a grounded AC supply grid 12 via the transformerless power converter 10. There may thus be two operating states for the DC grid 14: an ungrounded "stand-alone mode" with a power supply from the battery 42 and a grounded mode when connected to the grounded AC supply grid 12.

The DC link circuit 21 of the bridge circuit 20, in one embodiment, is precharged when the power converter 10 is started up, before the AC side 16 or DC side 18 is connected to the corresponding grids 12, 14. This is desired in order, for example, to limit charging currents of capacitors of the DC link circuit 21 upon an initial connection to the DC grid 14.

An AC precharging circuit 40 of the power converter 10 is configured to perform such precharging from the AC supply grid 12 and has galvanic isolation for this purpose. The DC link circuit 21 of the bridge circuit 20 is prechargeable directly from the AC supply grid 12 via the AC precharging circuit 40. To this end, the AC side of the AC precharging circuit 40 is connected to the AC side 16 of the inverter 10. The AC precharging circuit is driven by the control circuit or unit 30. A semiconductor switch 38 is connected between the rectifier 36 and the DC terminal DCL−. It is also driven by the control circuit or unit 30.

The power converter 10 also has a fault current measurement 32 at the AC terminals ACL1, ACL2, ACL3, which is based on a differential current measurement of the three AC terminals ACL1, ACL2, ACL3.

Figure 2:
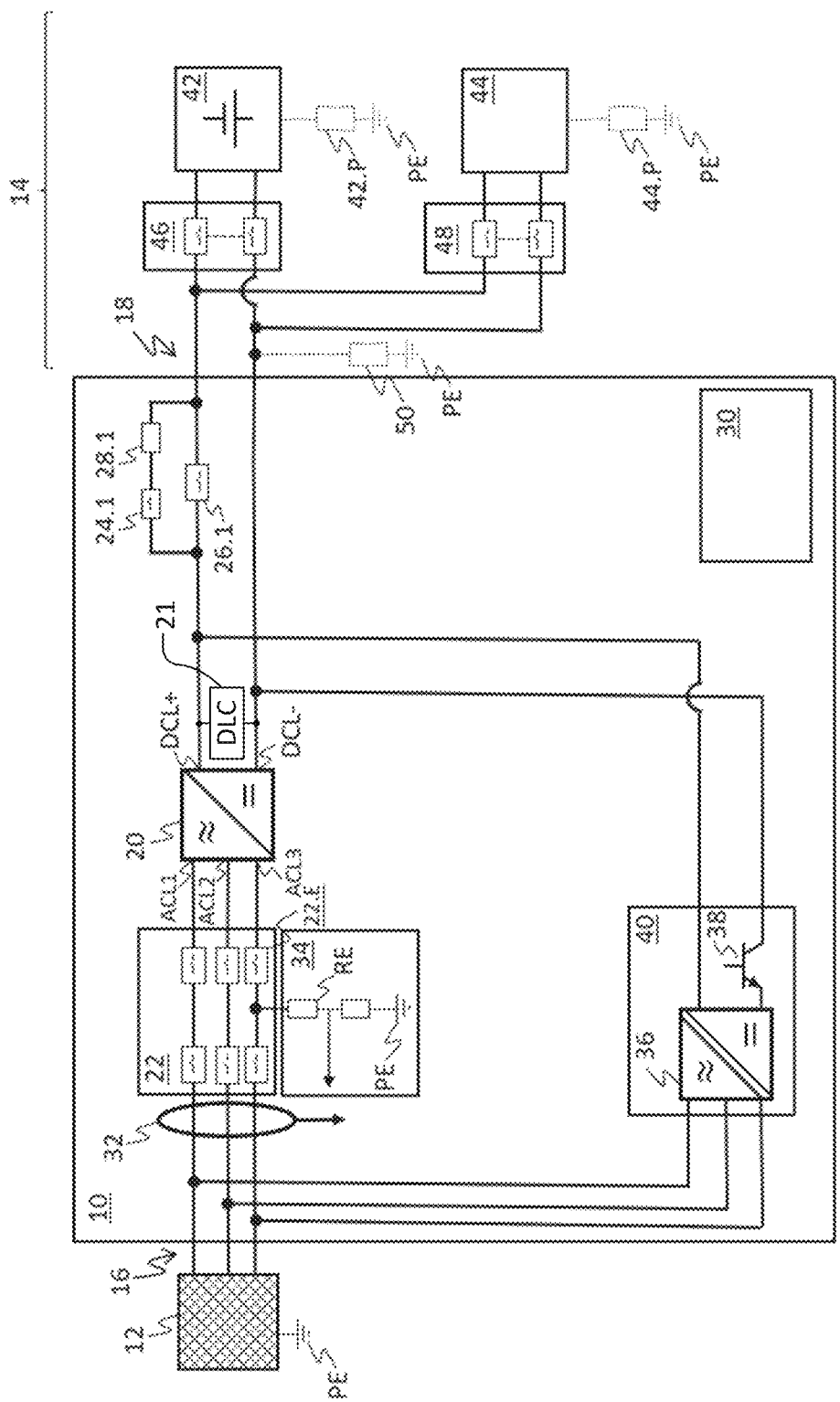
FIG. 2 shows a single-pole embodiment of a circuit breaker arrangement.

The AC connections ACL1, ACL2, ACL3 are connectable to the AC side 16 via AC switches 22. Provision is made for an insulation monitor 34, which may be connected to the mid-potential of a half-bridge of the bridge circuit 20 via a grounding switch 22.E. The insulation monitor 34 may also be connected to ground potential PE via a grounding switch SE. The insulation monitor 34 serves to monitor the insulation resistance 50 of the DC grid if it is connected. For this purpose, the insulation monitor 34 has a grounding resistor RE, via which the mid-potential is connected to the ground potential. Such an insulation monitor 34 is described, for example, in WO2013/178654 A1. In an embodiment shown in FIG. 2, the insulation monitor may also have only one grounding switch 22.E, which at the same time represents part of the switchable connection between the AC terminals ACL3 and the AC side 16.

The DC terminal DCL+ is connectable to the DC side 18 via a circuit breaker 26.1. The DC terminal DCL− is connectable to the DC side 18 via a circuit breaker 26.2. An additionally connectable precharging resistor 24.1 is provided for the DC terminal DCL+. An additionally connectable precharging resistor 24.2 is provided for the DC terminal DCL−. The circuit breakers 26.1, 26.2 with an additionally connectable precharging resistor 24.1, 24.2 are designed to be connectable by bridging the circuit breaker 26.1, 26.2 or as a looped-in parallel connection comprising a semiconductor switch 24.1, 24.2 and a precharging resistor 28.1, 28.2.

In a departure from the two-pole embodiment of a circuit breaker arrangement shown and described above in FIG. 1, FIG. 2 also shows a single-pole embodiment of a circuit breaker arrangement. The DC terminal DCL− is in this case connected directly to the DC side, that is to say without a circuit breaker.

Figure 3:
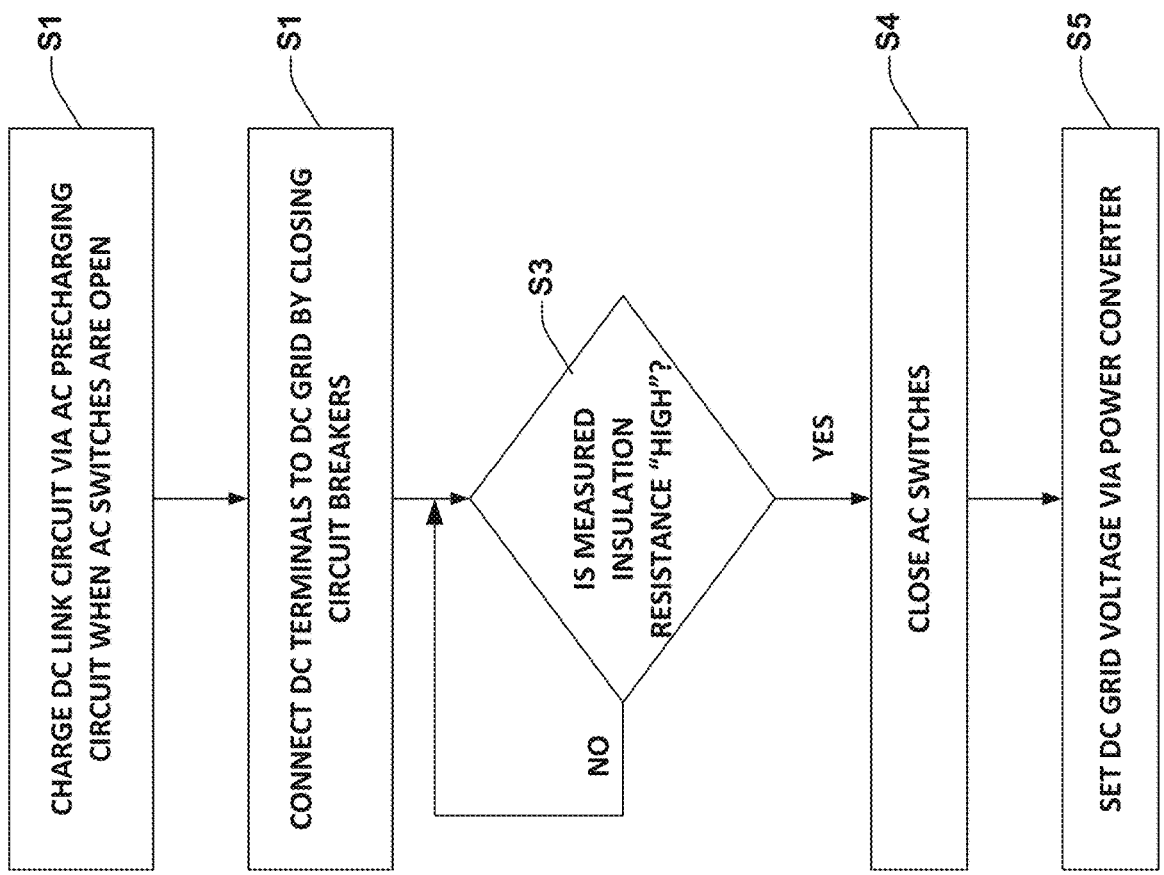
FIG. 3 schematically shows one example embodiment of a method.

FIG. 3 schematically illustrates a method for supplying power to the ungrounded DC grid 14 from the grounded three-phase AC supply grid 12 using the transformerless power converter 10. At act S1, the DC link circuit is charged from the AC supply grid 12 by the AC precharging circuit 40 when the AC switches 22 are open. At S2, the DC terminals DCL+, DCL− are connected to the DC grid 14 by closing the circuit breakers 26.1, 26.2. Then, at S3, the insulation resistance 50 of the DC grid 14 is measured using an insulation monitor 34 and, if the insulation resistance 50 is high enough (YES at S3), the AC switches 22 are closed at S4 and a voltage of the DC grid 14 is set by the power converter 10 at S5. If it is determined at S3 that the insulation resistance 50 is not high enough (NO at S3), that is to say the DC grid 14 does not have a sufficiently high insulation to ground potential PE, then act S3 is repeated.

In one embodiment, the insulation resistance 50 is measured at S3 with the switch 22.E closed in order to connect the insulation monitor 34 to the mid-potential of the bridge circuit 20.

Optionally, at least one DC terminal DCL+, DCL− may be connected to the DC grid 14 via a precharging resistor 28.1, 28.2 at S2. Providing the precharging resistors 28.1, 28.2 makes it possible to monitor the insulation resistance 50 using the insulation monitor 34 at S2 when the DC grid 14 is connected to the power converter 10, wherein the precharging resistor 28.1, 28.2 in this case—in the event of a fault—can protect against excessively high currents. The DC terminals DCL+, DCL− may initially be additionally connected individually and then together if the insulation resistance 50 of the DC grid 14 is high enough.

What is claimed is:

1. A power converter for transferring power between an AC side of the power converter and a DC side of the power converter, wherein the AC side of the power converter is connected to a grounded three-phase AC supply grid and the DC side of the power converter is connected to an ungrounded DC grid, wherein the power converter comprises a bridge circuit having AC terminals connected to the AC side of the power converter via AC switches and the bridge circuit having DC terminals connected to the DC side of the power converter via circuit breakers,
    wherein a DC link circuit of the power converter is configured to be charged from the grounded three-phase AC supply grid via a galvanically isolating AC precharging circuit, and
    wherein the power converter has an insulation monitor that is configured to measure an insulation resistance of the DC side of the power converter when the galvanically isolating AC precharging circuit is connected to the DC link circuit.

2. The power converter as claimed in claim 1, wherein the AC terminals and the DC terminals of the bridge circuit are galvanically coupled and a power transfer path between the AC side and the DC side of the power converter is configured to be transformerless.

3. The power converter as claimed in claim 1, wherein the insulation monitor is arranged between the AC side of the power converter and the AC terminals of the bridge circuit.

4. The power converter as claimed in claim 3, wherein the insulation monitor comprises a grounding resistor that connects a potential, which lies between switching elements of a half-bridge circuit, of the bridge circuit to ground potential via a grounding switch.

5. The power converter as claimed in claim 4, wherein at least one of the AC switches serves as the grounding switch.

6. The power converter as claimed in claim 1, wherein at least one circuit breaker with an additionally connected precharging resistor is present for each DC terminal.

7. The power converter as claimed in claim 1, wherein at least one circuit breaker with an additionally connected precharging resistor is present for solely one of the DC terminals.

8. The power converter as claimed in claim 1, further comprising an insulation monitoring device configured to perform a fault current measurement on the AC terminals.

9. The power converter as claimed in claim 1, further comprising a control circuit configured to:
    precharge the DC link circuit through the galvanically isolating AC precharging circuit when the AC switches are open,
    connect the DC terminals to the ungrounded DC grid by closing the circuit breakers,
    measure the insulation resistance of the ungrounded DC grid with the insulation monitor, and
    when the insulation resistance is higher than a predetermined value: close the AC switches and set a voltage of the DC grid using the power converter.

10. The power converter as claimed in claim 9, wherein the control circuit is configured to charge the DC link circuit with a power that is significantly lower than a rated power of the power converter.

11. The power converter as claimed in claim 9, wherein the power converter is configured to set the voltage of the DC side while the DC side is connected to the DC terminals without an interposition of precharging resistors.

12. A method for supplying power to an ungrounded DC grid from a grounded three-phase AC supply grid using a transformerless power converter comprising a bridge circuit DC terminals of which are connected to the DC grid by way of circuit breakers and AC terminals of which are connected to the AC supply grid via AC switches, and comprising a galvanically isolating AC precharging circuit configured to precharge a DC link circuit of the transformerless power converter from the AC supply grid, wherein the method comprises:
    precharging the DC link circuit through the galvanically isolating AC precharging circuit when the AC switches are open,
    connecting the bridge circuit DC terminals to the DC grid by closing the circuit breakers,
    measuring an insulation resistance of the DC grid with an insulation monitor, and
    when the insulation resistance is above a predetermined level: closing the AC switches, and
    setting a voltage of the DC grid using the power converter.

13. The method as claimed in claim 12, wherein at least one DC terminal is connected to the DC grid via a precharging resistor.

14. The method as claimed in claim 13, wherein measuring the insulation resistance comprises connecting a first DC terminal to the DC grid via a first precharging resistor, and connecting a second DC terminal, different from the first DC terminal, to the DC grid via a second precharging resistor, wherein the insulation resistance is measured from measured values acquired while only the first DC terminal and while both DC terminals are connected.

15. The method as claimed in claim 12, further comprising setting the voltage of the DC grid by the power converter while the DC grid is connected to the bridge circuit DC terminals without an interposition of precharging resistors.

16. The method as claimed in claim 12, wherein at least one DC terminal is connected to the DC grid via a precharging resistor when the AC switches are closed.

17. The method as claimed in claim 12, further comprising:
    in an event of failure of the AC supply grid, opening the AC switches and continuing to operate the DC grid via an energy source connected to the DC grid, wherein the insulation resistance of the DC grid is continuously or repeatedly measured using the insulation monitor during continued operation.

18. The method as claimed in claim 12, wherein, after the AC switches have been closed, performing insulation monitoring of the DC grid by way of a fault current measurement on the AC terminals.

* * * * *